United States Patent [19]

Lepert

[11] 4,245,075

[45] Jan. 13, 1981

[54] CARENE MODIFIED PETROLEUM RESINS

[75] Inventor: André Lepert, Rhode Saint Genese, Belgium

[73] Assignee: Exxon Research & Engineering Co., Florham Park, N.J.

[21] Appl. No.: 51,009

[22] Filed: Jun. 22, 1979

[30] Foreign Application Priority Data

Jun. 27, 1978 [GB] United Kingdom ............... 27941/78

[51] Int. Cl.$^3$ .................. C08F 110/00; C08F 132/08; C08F 136/00
[52] U.S. Cl. ..................................... 526/280; 428/343; 428/355; 526/75; 526/290
[58] Field of Search ........................... 526/75, 280, 290

[56] References Cited

U.S. PATENT DOCUMENTS

| | | | |
|---|---|---|---|
| 2,354,775 | 8/1944 | Rummelsburg | 526/280 |
| 2,391,293 | 12/1945 | Carmody | 260/80 |
| 2,391,359 | 12/1945 | Spurlin | 260/80 |
| 2,750,359 | 6/1956 | Hamner et al. | 526/290 |
| 3,478,007 | 11/1969 | Barkley et al. | 526/280 |
| 4,078,132 | 3/1978 | Lepert | 526/290 |

FOREIGN PATENT DOCUMENTS 1537852 1/1979 United Kingdom .
1538057 1/1979 United Kingdom .

OTHER PUBLICATIONS

Yeddanapalli et al., Chem. Abs., 53 (1959), p. 1405(g).
Rozhkov, Chem. Abs., 60 (1964), p. 15989(c).
Chem. Abs., 67 (1967), p. 100751(x).
Werner, Chem. Abs., 70 (1969), p. 38306(n).

*Primary Examiner*—Harry Wong, Jr.
*Attorney, Agent, or Firm*—Rebecca Yablonsky

[57] ABSTRACT

Producing modified petroleum resins by the Friedel Crafts copolymerization of a $C_5$ olefines and diolefines, $C_6$ olefines or diolefines or a mixture of $C_5$ and $C_6$ olefines and diolefines feed and carene optionally together with a branched chain olefine.

11 Claims, No Drawings

CARENE MODIFIED PETROLEUM RESINS

CROSS-REFERENCE TO RELATED APPLICATIONS

This application is based on British No. 27941/78, filed June 27, 1978.

The present invention relates to new improved petroleum resins and a process for their production. In particular, the invention relates to resins suitable as tackifiers for elastomers and useful in hot melt formulations.

Petroleum resins obtained by the polymerisation of $C_5$ dienes such as pentadiene 1,3 and/or isoprene are well known as is their use as tackifiers for elastomers and as components in hot melt formulations.

It is known that SIS block copolymers (block styrene-isoprene copolymers such as Shell Cariflex TR 1107) can be tackified by petroleum resins of narrow molecular weight distribution produced by controlling the polymerization conditions with branched reactive olefins, substituted aromatics or tertiary alkyl halides, see for example our prior U.S. patent application Ser. Nos. 31878/75 and 33705/75. These previously described petroleum resins of narrow molecular weight distribution tackify oil extended random SBR (styrene-butadiene) copolymers and provide very good tackifying properties for the SIS block copolymers. However, they also have a low cohesive strength in pressure sensitive adhesives based on natural rubber. They do not, however, tackify oil-free SBR elastomers of either random or block thermoplastic nature (e.g. SBS block copolymers).

Other petroleum feed additives, for example dicyclopentadiene, methyl cyclopentadiene dimers or thermal polymers obtained from cyclodiene dimer-rich streams as described in our prior patent U.K. No. 11486211 are known as a means of making resins of high softening point. However, the resins produced in this way have degraded resin Gardner colour and wax compatibility. Moreover even if they increase the cohesive strength of pressure sensitive adhesives based on natural rubbers and slightly tackify SIS block copolymers they do not tackify other SBR copolymers.

One disadvantage of these earlier techniques is that the presence of the molecular weight controlling additive tends to reduce the softening point of the resin thus rendering it unsuitable for certain pressure sensitive adhesives, particularly those where cohesive strength (shear adhesion) is important. It has been proposed to overcome this problem by carrying out the polymerisation in a paraffinic solvent, which is not entirely satisfactory and increases costs and reduces plant capacity.

We have now found that these disadvantages may be largely overcome if carene is copolymerized with the petroleum resin feed.

The present invention therefore provides a process which comprises copolymerizing using a Friedel Crafts catalyst (1) a petroleum resin feed comprising $C_5$ olefins and diolefins, $C_6$ olefins and diolefins or a mixture of $C_5$ and $C_6$ olefins and diolefins, said feed being obtained from the cracking of petroleum feedstock and (2) carene.

The present invention further provides the petroleum resin prepared according to the process described above.

The $C_5$ or $C_6$ diolefin and olefin containing feed used in our process may be obtained from the cracking of petroleum feedstock. Such feedstocks include naphthas, kerosene, gas oil and vacuum gas oil. These feedstocks usually boil in a range of from 20° C. to 450° C.

The petroleum feedstock is cracked, preferably in the presence of steam, and the recommended cracking temperature is between 500° and 870° C. The product, which contains unsaturated hydrocarbons usually boiling in the range of 20° to 240° C., preferably 20° to 130° C., usually is thereafter subjected to fractionation to remove $C_2$ to $C_4$ light ends. The feedstock may thereafter be subjected to thermal soaking at a temperature of between 100° C. and 160° C., preferably 120° to 140° C., e.g. at about 130° C. The thermal soaking preferably takes 0.5 to 6 hours, e.g. 0.5 to 1 hour. Low temperatures are preferred in order to limit the cyclic diene (cyclopentadiene and methylcyclopentadiene) co-dimerization with $C_5$ linear conjugated dienes (isoprene and pentadienes 1,3 cis- and trans-). After fractionation and, if carried out, thermal soaking, the feedstack is preferably subjected to distillation to remove cyclic conjugated diolefins which are gel precursors (cyclopentadiene and methylcyclopentadiene being removed as dimers).

After distillation one obtains an overhead naphtha which usually boils in the range from 25° to 110° C., e.g. 25° to 80° C., the best results being achieved with a 25°-70° C. cut. This overhead naphtha comprises mainly $C_5$ diolefins such as isoprene and 1,3 cis- and trans- pentadienes, $C_5$ to $C_6$ monoolefins and aromatics, for example benzene. In general the overhead naphthas have the following compositions:

|  | % by weight |
|---|---|
| total paraffins | 1.0 to 41.5 |
| total diolefins | 33.5 to 14.5 |
| total olefins | 33.5 to 13.0 |
| total aromatics | 30.0 to 31.0 |
| isoprene | 16.5 to 6.5 |
| pentadiene 1,3 | 15.5 to 4.5 |
| cyclopentadiene | 1.0 to 2.5 | the exact composition depending on the nature of the petroleum feedstock which is subjected to steam cracking. Cyclopentene contents are generally below 3.0 wt.%.

The feed could be significantly isoprene free provided this compound is previously recovered through any conventional extraction process such as extractive distillation or azeotropic distillation. In such cases the properties of the resins produced are better than those obtained with isoprene-containing feeds. In this case the feed may be a narrow fraction pentadiene 1,3 concentrate. A typical such composition contains less than 1.5 wt.% isoprene, from 50 to 80 wt.% pentadiene 1,3 (cis and trans isomer), the balance being generally cyclopentene, typically 15 to 20 wt.%, other $C_5$ and $C_6$ olefins, diolefins and paraffins making up the remainders. Moreover, depending on the final boiling point of the feed cut, the feedstock could be substantially free of benzene.

If thermal soaking has been carried, out the cyclodiene dimers which are produced are generally not included in the feed to be polymerized because they are detrimental to the specific properties of the resins. However, if required for special applications, they can be left in the resin feed, the distillation step previously mentioned being carried out before the thermal soaking step.

From 10 wt.% to 90 wt.%, preferably from 20 wt.% to 70 wt.% of carene based on the combined weight of petroleum resin feed and carene should be used; generally from 10 wt.% to 40 wt.% is used as carene is expensive and concentrations above 40 wt.% lead to too low a molecular weight. The carene used may be any of the carene isomers; it may be delta-2-carene, delta-3-carene or a mixture of the two compounds. Alternatively, and as is preferred, the carene may be a concentrate obtained from gum or crude turpentine and we particularly prefer to use a delta-3-carene concentrate obtained by rectification of crude turpentine which generally contains from 50% to about 95 wt.% of carene. A sample of a typical such material was found to contain:

| | |
|---|---|
| pinene | 1.75 wt. % |
| carene | 83.90 wt. % |
| terpinene | 0.45 wt. % |
| cymene | 1.68 wt. % |
| limonene | 7.38 wt. % |
| terpinolenes | 0.57 wt. % |
| unidentified | 4.27 wt. % |

We found that the use of carene surprisingly narrows the molecular weight distribution of the resin, at the same time increasing the softening point of the resin.

Other unsaturated cyclic monomers may also be included in the copolymerization. For example one or more of norbornene, vinyl-norbornene, dicyclopentadiene, methyl cyclopentadiene, vinyl cyclohexane, tetrahydroindene and other terpenes such as pinene may be included.

The techniques of the present invention are equally applicable to resin production process which employ other agents to narrow the molecular weight distribution such as the branched reactive olefins of our U.K. Pat. No. 1538057 to achieve extremely narrow distribution without reduction of softening point. Similarly the carene may be incorporated into systems which use a solvent to keep up softening points or the need for the solvent may be obviated by the use of the carene. The ratios of the amount of carene and petroleum resin feed to the amount of branched olefine used may be varied to obtain resins of any desired softening point within the range 60° C. to 140° C. Where branched olefins are used a broad (e.g. $C_5$–$C_8$) fraction of our U.K. Pat. No. 1,538,057 may be used. The preferred branched olefins are oligomers of propylene and butylenes obtained with phosphoric acid catalysts or from fluid catalytic cracker.

Other chain transfer agents such as the alkyl halides of our U.K. application No. 31878/75 may also be used.

Similarly, oxygenated transfer agents may be used such as mono-, di- or tri-substituted phenols, the substituent being a $C_1$ to $C_{30}$ or preferably $C_1$ to $C_6$ straight chain or branched chain hydrocarbyl group e.g. methyl, ethyl, propyl, butyl, amyl or their secondary or tertuary isomers, (e.g., 2,6 ditertiary-butyl-4-methyl phenol), alcohols, esters, dialkyl ethers, alkaryl ethers, the alkyl group in the ether being $C_1$ to $C_{30}$, preferably $C_1$ to $C_6$ straight or branched chain hydrocarbyl group e.g. methyl, ethyl, amyl or their secondary or tertiary isomers, (e.g. anisole), organic acids or anhydrides (e.g. maleic anhydride). When used, the oxygenated transfer agent should preferably have a boiling point lower than 300° C. If low boiling point compounds, e.g. diethyl ether, are used the polymerisation temperature and pressure should be carefully chosen so as to maintain them in the liquid state.

The most efficient compounds in the presence of $AlCl_3$ are dialkyl ethers or an alkaryl ether, such as anisole since they act as solvents for the catalysts. Since the polymerisation is usually carried out between 30° to 80° C., any such additive should be of adequate boiling point in order to maintain it in the liquid phase.

The amount of oxygenated compound used as transfer agent can vary from 0.1 to 5 wt.%, preferably 0.5 to 2 wt.%, based on the weight of petroleum resin feed. They are generally less attractive than the branched chain reactive aliphatic olefins previously described.

$C_8$ to $C_{10}$ unsaturated aromatic compounds may be with the petroleum feed and carene optionally containing the olefin as described in the U.K. Pat. No. 1,538,057 and/or the oxygenated transfer agent described above. Examples of suitable aromatics include styrene, a-methyl styrene, vinyl toluene, indene and methyl indene and their chlorinated and oxygenated derivatives. When used, the concentration should preferably vary from 10 to 400% by weight, particularly 10 to 50% by weight, based on the weight of the petroleum resin feed.

The resin feed and the carene are mixed and polymerized using a Friedel Crafts catalyst, for example aluminium chloride, aluminium bromide or a liquid aluminium chloride/hydrochloric acid alkyl substituted aromatic hydrocarbon complex, the aromatic hydrocarbon being for example o-xylene, mesitylene, ethyl benzene, isopropyl benzene and other short or long chain alkyl benzenes. The alkyl chain can be linear or branched and can vary from 1 to 30 carbon atoms.

Acid liquid $AlCl_3$ sludges obtained as by-products during the alkylation of benzene or any other substituted aromatics (e.g. toluene or xylenes) with branched chain olefins can be directly used as catalyst for the above described polymerisation process. The branched chain olefins which are, for example, produced via the boron trifluoride oligomerisation of propylene and fractionation, e.g. $C_{12}$ olefins or $C_{24}$ olefins, can be alkylated with aromatics producing in situ sludge. As an example the acidic sludge available from a dodecylbenzene plant provided results similar to the preformed o-xylene $AlCl_3$/HCl liquid complex. Sludges from other substituted branched or straight chain aromatic production, for example, meta and/or para diisopropyl benzenes and para-tertiary butyl benzene may also be used.

These liquid complexes are slightly more efficient than $AlCl_3$ powder at equivalent concentration and provide slightly higher resin yields and lower resin molecular weight. Therefore, the amount of carene required for narrowing the resin molecular weight is significantly reduced. Moreover, when by-product sludges are available in plant site, the catalyst cost is reduced and such a process is particularly attractive although powdered $AlCl_3$ results in resin having better Gardner colour.

In the polymerisation process the amount of catalyst may vary from 0.25 to 3.0 wt.%, preferably 0.5 to 1.5 wt.% based on the weight of the mixture to be polymerized. The optimum concentration depends on the nature of the solvent which affects the solubility of the catalyst as well as on the stirring efficiency inside the polymerisation reactor. High catalyst concentration reduces the resin molecular weight distribution and therefore limits the amount of carene required for controling the resin molecular weight.

Other Friedel-Crafts catalysts like titanium tri- or tetrachloride, tin tetrachloride, boron trifluoride, boron trifluoride complexes with organic ethers, phenols or acids can also be used but they lead to rather low resin yields and large quantities of liquid oligomers of low value are obtained. Even though these oily oligomers can be upgraded as reactive plasticizer, or liquid plasticizer such catalysts are not recommended. Other possible catalysts can be acidic clays.

Usual polymerisation temperatures are between −20° C. and 100° C., preferably between 30° and 80° C.

After polymerisation, the residual catalyst may be removed by, for example, washing with aqueous solution of alkali, ammonia or sodium carbonate, or by the addition of an alcohol such as methanol and subsequent filtration.

The final resin may be stripped of unreacted hydrocarbons ("raffinate" rich in benzene and/or paraffins/unreactive olefins) and low molecular weight oil oligomers by stream stripping or vacuum distillation. The finished product is a substantially non-aromatic unsaturated thermoplastic hydrocarbon resin. It usually has a softening point of from 60° C. to 140° C., preferably 70° to 130° C.

The resins obtained can be used in many applications which require low viscosity, good flexibility and elongation before or especially after chemical modification with polar compounds such as phenols, unsaturated anhydrides such as maleic anhydride or unsaturated acids (e.g. fumaric acid). These resins are designed for a wide range of end uses and applications. They can be applied to paper, metal, thermoplastic films (cellophane, polyesters, PVC, woven or non-woven fabrics, glass etc. and for bonding such materials together). Typical application are hot melts, carpet backing, coating with drying oil formulations, book binding, paper sizing or in any applications involving natural or synthetic resins and/or rubbers such as caulks, sealants or rubber tackification. More especially they may be used as tackifiers with natural rubber or synthetic rubbers such as polyisoprene, EPDM, butyl, chorobutyl, bromobutyl, neoprene and block copolymers, for example, styrene/isoprene rubber (Shell Cariflex TR 1107) and mixtures of such rubbers. Even though these resins are significantly non-aromatic they provide outstanding tackiness with such elastomers and high resin/rubber ratios can be used for reducing the adhesive formulation cost (the resin being significantly cheaper than the block styrene/isoprene rubber).

Other applications involving such resin properties are pressure sensitive adhesives, hot melt adhesives, low temperature adhesives, label adhesives, latex adhesives, surgical tapes and masking tapes where they may be blended with polymers such as ethylene/vinyl acetate copolymers optionally blended with wax.

Thus, hot melt adhesives and latex adhesives can be prepared from styrene - isoprene block copolymers and a tackifying resin. The low softening point aliphatic petroleum resins are a replacement for aromatic resins or rosin and terpene derivatives.

The present invention is illustrated but in no way limited by reference to the following examples.

EXAMPLE 1

The carene-rich stream described above, a piperylene rich stream comprising:
pentadiene 1:3 trans—48.5 wt.%
pentadiene 1:3 cis—23.6 wt.%
cyclopentene—17.5 wt.%
cyclopentane—8.1 wt.%
others (paraffins/olefins etc)—2.3 wt.% and a fluid catalytic cracker olefin stream of final boiling point 100° C. containing:
33.90 wt.% paraffins
0.33 wt.% diolefins
58.40 wt.% olefins
0.11 wt.% aromatics
total $C_4$'S 17.15 wt.%
were fed to a 2 liter glass reactor in the ratios given in Table 1 below. The reactor was fitted with a mechanical stirrer, a cooler and catalyst injection device. 1 wt.% of powdered $AlCl_3$ as catalyst based on the total weight of the feed was injected into the reactor which was then held at 50° C. for 90 minutes.

The solvent used contained:
99.44 wt.% paraffins
0.50 wt.% aromatics
0.06 wt.% unknown
and contained 10 parts per million of sulphur.

The properties of the resins obtained are also given in Table 1.

Table 1

| Feed Composition | 1 | 2 | 3 | 4 | 5 | 6 |
| --- | --- | --- | --- | --- | --- | --- |
| Carene Concentrate (wt. %) | 40 | 20 | 20 | 25 | 20 | 32.5 |
| Solvent (wt. %) | 30 | 40 | 30 | 37.5 | 30 | 35 |
| Benzene (wt. %) | 30 | | 30 | | 30 | — |
| Pentadiene 1:3 concentrate (wt. %) | | 20 | | 25 | 20 | 32.5 |
| Fluid cat cracker olefin (wt. %) | | 20 | 20 | 12.5 | | |
| Carene in Total Feed (wt. %) | 33.6 | 16.8 | 16.8 | 20.9 | 16.8 | 27.3 |
| Pentadiene in Total Feed (wt. %) | | 14.4 | | 18.0 | 14.4 | 23.4 |
| Product | | | | | | |
| Resin (wt. %) | 1.2 | 27.2 | trace | 33.4 | 27.6 | 39.2 |
| Liquid Oligomers (wt. %) | 9.4 | 10.4 | 10 | 11.8 | 3.2 | 14.0 |
| Ureacted Compounds (wt. %) | 89.4 | 62.4 | 90 | 54.8 | 69.2 | 46.8 |
| Product Properties | | | | | | |
| Resin softening point ASTM E-28 | 102 | 112 | 20 | 112 | 124 | 116 |
| Gardner colour ASTM D-1544 | | 3.5 | | 3.5 | 3+ | 3+ |
| Heat stability | | 12.5 | | 11 | 11 | 10.5 |
| (colour after 16 hrs at 150° C.) | | | | | | |
| Wax cloud point °C. | | | | | | |
| Wax/resin/EVA* | | | | | | |
| 40:40:20 | | 86 | | 84 | 88 | |
| 50:25:25 | | 68 | | 68 | 68 | 74 |
| Molecular wt. g.P.C. | | | | | | |
| $\overline{Mn}$ | | | | 1190 | 1110 | 1360 |
| $\overline{Mw}$ | | | | 2265 | 2345 | 3015 |

Table 1-continued

| Feed Composition | 1 | 2 | 3 | 4 | 5 | 6 |
|---|---|---|---|---|---|---|
| $\overline{Mw}/\overline{Mn}$ | | | | 1.91 | 2.11 | 2.21 |
| Pressure Sensitive Adhesive Properties | | | | | | |
| (Resin: Natural Rubber = 50:50 wt) | | | | | | |
| 180° Peel Strength (PSTC-1** 1lbs/inch) | | 2.95 | | 3.10 | 2.90 3.20 | 2.95 |
| Polyken Tack (grams) ASTM D-2979 | | 1150 | | 1300 | 1300 | 1250 |
| Tack Rolling Ball (cm) PSTC-6 | | 1.5 | | 1.5 | 1.5 | 3 |
| 178° Holding power PSTC-7 (hours to failure) | | 23 | | 18 | 13 | 46 |

*Ethylene/vinyl Acetate copolymer containing 28 wt% vinyl acetate and of Melt Index 12-18.
*Wax having a melting point of −65° C.
**Pressure sensitive Tape Council Test method.

EXAMPLE 2

The effect of the presence of carene on the softening point and the molecular weight distribution with and without the paraffinic solvent was assessed using the reactor used in Example 1. The pentadiene 1:3 feed consisted of:

pentadiene 1:3 trans—42.7 wt.%
pentadiene 1:3 cis—24.2 wt.%
cyclopentene—17.5 wt.%
cyclopentene—8.5 wt.%
others—7.1 wt.% and the polymerisation conditions were as in Example 1. The results are shown in the following Table 2, together with the properties of the products obtained (same test methods as in Example 1).

Table 2

| Feed Composition | | | | |
|---|---|---|---|---|
| Carene concentrate (wt. %) | | | 9 | 12.5 |
| Solvent (wt. %) | 30 | | 27 | |
| F.C.C. olefins (wt. %) | 41 | 58 | 37 | 51.0 |
| Pentadiene 1,3 concentrate (wt. %) | 29 | 42 | 27 | 36.5 |
| Carene in Total Feed (wt. %) | | | 7.5 | 10.5 |
| Pentadiene in Total Feed (wt. %) | 19.4 | 28.0 | 18.0 | 24.4 |
| Product | | | | |
| Resin (wt. %) | 27.8 | 40.0 | 28.8 | 39.8 |
| Liquid oligomers (wt. %) | 5.2 | 6.3 | 7.7 | 10.0 |
| Unreacted Compounds (wt. %) | 67.0 | 53.7 | 63.5 | 60.2 |
| Product Properties | | | | |
| Softening Point | 100 | 93 | 104 | 100 |
| Gardner Colour | 4− | 3+ | 4− | 4− |
| Heat Stability | 14 | 13.5 | 13.5 | 14.5 |
| Molecular Wt $\overline{Mn}$ | 1350 | 1295 | 1185 | 1285 |
| $\overline{Mw}$ | 2990 | 2350 | 2550 | 2400 |
| $\overline{Mw}/\overline{Mn}$ | 2.21 | 1.81 | 2.15 | 1.86 |
| Wax Cloud Point °C. | | | | |
| 40:40:20 | 72 | 70 | 68 | 68 |
| 50:25:25 | | | 83 | 88 |
| 180° Peel Strength (lb/inch) | 2.1 | 2.2 | 2.65 | 2.45 |
| Polyken Tack (grams) | 950 | 870 | 1050 | 1150 |
| Tack Rolling Ball (cm) | 2 | 1 | 2 | 1.5 |
| 178° Holding Power | 62 | 27 | 36 | 64 |

I claim:

1. A process for the production of modified petroleum resins comprising copolymerising, using a Friedel-Crafts catalyst, a mixture of
   (i) a petroleum resin feed comprising C5 olefins and diolefins, C6 olefins and diolefins or a mixture of C5 and C6 olefins and diolefins, said feed being obtained from the cracking of petroleum feedstock and (ii) from 10 wt. % to 90 wt. % of carene based on the weight of the total mixture.

2. A process according to claim 1 in which from 20 wt. % to 70 wt. % of carene is used based on the weight of the total mixture.

3. A process according to claim 1 in which a delta - 3 - carene concentrate obtained by rectification of crude turpentine is used.

4. A process according to claim 1 wherein branched chain olefins which are oligomers of propylene and butylenes obtained with phosphoric acid catalysts or from a fluid catalytic cracker, are also copolymerised with the petroleum resin feed and the carene.

5. A process according to claim 1 in which the petroleum resin feed comprises:

| | % by Weight |
|---|---|
| total paraffins | 1.0 to 41.5 |
| total diolefins | 35.5 to 14.5 |
| total olefins | 33.5 to 13.0 |
| total aromatics | 30.0 to 31.0 |
| isoprene | 16.5 to 0 |
| pentadiene 1,3 | 15.5 to 4.5 |
| cyclopentadiene | 1.0 to 2.5 |

6. A process according to claim 1 in which the petroleum feed comprises a narrow fraction pentadiene 1,3 concentrate containing less than 1.5 wt.% isoprene and from 50 to 80 wt.% pentadiene 1,3.

7. A modified petroleum resin comprising a copolymer of
   (i) a petroleum resin feed obtained from cracking petroleum feedstock and comprising C5 olefins and diolefins, C6 olefins and diolefins or a mixture of C5 and C6 olefins and diolefins, and (ii) from 10 to 90 wt. % carene based on the weight of the total mixture.

8. A modified petroleum resin according to claim 7 in which the petroleum resin feed comprises

| | % by Weight |
|---|---|
| total paraffins | 1.0 to 41.5 |
| total diolefins | 35.5 to 14.5 |
| total olefins | 33.5 to 13.0 |
| total aromatics | 30.0 to 31.0 |
| isoprene | 16.5 to 0 |
| pentadiene 1,3 | 15.5 to 4.5 |
| cyclopentadiene | 1.0 to 2.5 |

9. A modified resin according to claim 7 wherein the petroleum feed comprises a narrow fraction pentadiene 1,3 concentrate containing less than 1.5 wt.% isoprene and from 50 to 80 wt.% pentadiene 1,3.

10. A modified petroleum resin according to claim 9 containing co-polymerised branched olefins, said branched olefins being oligomers of propylene and butylenes obtained with phosphoric acid catalysts or from a fluid catalytic cracker.

11. A modified petroleum resin according to claim 1 having a softening point (ASTM E - 28) from 60° C.-140° C.

* * * * *